United States Patent
Kajiwara et al.

(10) Patent No.: US 12,413,832 B2
(45) Date of Patent: Sep. 9, 2025

(54) SUBSTRATE INSPECTION APPARATUS, SUBSTRATE INSPECTION METHOD, AND RECORDING MEDIUM

(71) Applicant: Tokyo Electron Limited, Tokyo (JP)

(72) Inventors: Daisuke Kajiwara, Koshi (JP); Tadashi Nishiyama, Koshi (JP); Hiroshi Tomita, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 184 days.

(21) Appl. No.: 18/152,887

(22) Filed: Jan. 11, 2023

(65) Prior Publication Data
US 2023/0224559 A1  Jul. 13, 2023

(30) Foreign Application Priority Data
Jan. 12, 2022  (JP) .................. 2022-002787

(51) Int. Cl.
*G06T 7/00*  (2017.01)
*G01N 21/00*  (2006.01)
(Continued)

(52) U.S. Cl.
CPC .......... *H04N 23/13* (2023.01); *G06T 7/0004* (2013.01); *H04N 23/45* (2023.01); *H04N 23/56* (2023.01);
(Continued)

(58) Field of Classification Search
CPC .... G01N 21/956; G01N 21/8806; G03F 1/84; H04N 23/56; G06T 7/00
See application file for complete search history.

(56) References Cited

U.S. PATENT DOCUMENTS 7,355,691 B2 * 4/2008 Yamaguchi .......... G01N 21/956
356/237.4
10,977,895 B2 * 4/2021 Shigeta ................. G07F 17/322
(Continued)

FOREIGN PATENT DOCUMENTS

JP     S56-32116 A     4/1981
JP     2003-258052 A   9/2003
(Continued)

OTHER PUBLICATIONS

Flexible prenoptic X-ray microscope—Longo—2022; (Year: 2022).*
Inspection methods—Overview and comparison; 2013; (Year: 2013).*

*Primary Examiner* — Luis Perez-Fuentes
(74) *Attorney, Agent, or Firm* — Chrisman Gallo Tochtrop LLC

(57) ABSTRACT

A substrate inspection apparatus configured to inspect a substrate with an image obtained by imaging a surface of the substrate includes a holder 31 configured to hold the substrate; a first light source unit 51 configured to emit visible light to the substrate held by the holder 31; a second light source unit 52 configured to emit infrared light to the substrate held by the holder 31; a first imaging sensor configured to capture a visible light image of the surface of the substrate by receiving first reflected light emitted from the substrate as a result of radiating the visible light; and a second imaging sensor configured to capture an infrared light image of the surface of the substrate by receiving second reflected light emitted from the substrate as a result of radiating the infrared light.

21 Claims, 9 Drawing Sheets

(51) Int. Cl.
*H04N 23/13* (2023.01)
*H04N 23/45* (2023.01)
*H04N 23/56* (2023.01)

(52) U.S. Cl.
CPC ............... *G06T 2207/10024* (2013.01); *G06T 2207/10048* (2013.01); *G06T 2207/10152* (2013.01); *G06T 2207/20221* (2013.01); *G06T 2207/30148* (2013.01); *G06T 2207/30164* (2013.01)

(56) References Cited

U.S. PATENT DOCUMENTS

| | | | |
|---|---|---|---|
| 11,231,363 B2* | 1/2022 | Shitara | G01N 21/86 |
| 2003/0169418 A1* | 9/2003 | Fujii | G01N 21/8806 |
| | | | 356/394 |
| 2012/0044344 A1* | 2/2012 | Zheng | G01N 21/896 |
| | | | 348/93 |
| 2013/0286396 A1* | 10/2013 | Matsumoto | G01J 3/501 |
| | | | 356/402 |
| 2016/0025654 A1* | 1/2016 | Song | G01N 21/95692 |
| | | | 356/237.2 |

FOREIGN PATENT DOCUMENTS

| | | |
|---|---|---|
| JP | 2007-294604 A | 11/2007 |
| JP | 2012-002648 A | 1/2012 |
| JP | 2017-152443 A | 8/2017 |
| JP | 2021-190802 A | 12/2021 |

* cited by examiner

| 1ch | 2ch | 3ch | |
|---|---|---|---|
| R IMAGE | G IMAGE | B IMAGE | → OUTPUT IMAGE 1 |
| R IMAGE | G IMAGE | NIR IMAGE | → OUTPUT IMAGE 2 |
| R IMAGE | NIR IMAGE | B IMAGE | → OUTPUT IMAGE 3 |
| NIR IMAGE | G IMAGE | B IMAGE | → OUTPUT IMAGE 4 |

SUBSTRATE INSPECTION APPARATUS, SUBSTRATE INSPECTION METHOD, AND RECORDING MEDIUM

CROSS-REFERENCE TO RELATED APPLICATION

This application claims the benefit of Japanese Patent Application No. 2022-002787 filed on Jan. 12, 2022, the entire disclosure of which is incorporated herein by reference.

TECHNICAL FIELD

The various aspects and embodiments described herein pertain generally to a substrate inspection apparatus, a substrate inspection method, and a recording medium.

BACKGROUND

Patent Document 1 describes a technique of removing a roughness component on a surface of a substrate and acquiring an image of a defective portion by radiating a near-infrared ray to the substrate and capturing an image of the substrate.

Patent Document 1: Japanese Patent Laid-open Publication No. 2012-002648

SUMMARY

In one exemplary embodiment, there is provided a substrate inspection apparatus configured to inspect a substrate with an image obtained by imaging a surface of the substrate. The substrate inspection apparatus includes a holder configured to hold the substrate; a first light source unit configured to emit visible light to the substrate held by the holder; a second light source unit configured to emit infrared light to the substrate held by the holder; a first imaging sensor configured to capture a visible light image of the surface of the substrate by receiving first reflected light emitted from the substrate as a result of radiating the visible light; and a second imaging sensor configured to capture an infrared light image of the surface of the substrate by receiving second reflected light emitted from the substrate as a result of radiating the infrared light.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
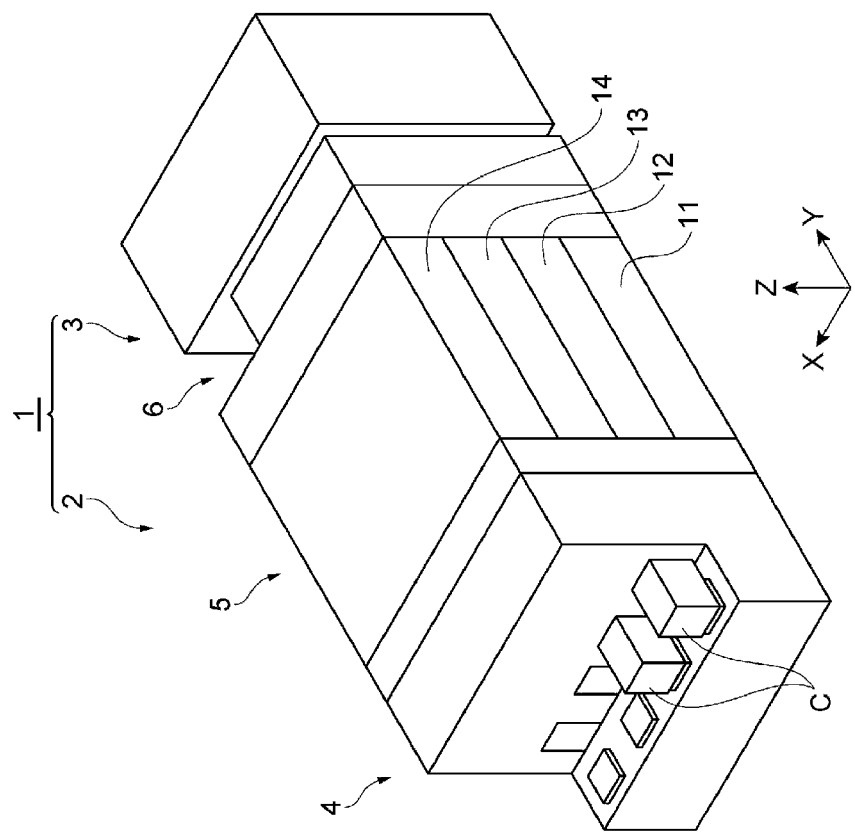
FIG. 1 is a schematic diagram illustrating an example of a schematic configuration of a substrate processing system.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, various exemplary embodiments will be described.

In one exemplary embodiment, there is provided a substrate inspection apparatus configured to inspect a substrate with an image obtained by imaging a surface of the substrate. The substrate inspection apparatus includes a holder configured to hold the substrate; a first light source unit configured to emit visible light to the substrate held by the holder; a second light source unit configured to emit infrared light to the substrate held by the holder; a first imaging sensor configured to capture a visible light image of the surface of the substrate by receiving first reflected light emitted from the substrate as a result of radiating the visible light; and a second imaging sensor configured to capture an infrared light image of the surface of the substrate by receiving second reflected light emitted from the substrate as a result of radiating the infrared light.

In this substrate inspection apparatus, since the visible light image of the surface of the substrate is acquired by the first imaging sensor and the infrared light image of the surface of the substrate is acquired by the second imaging sensor, the substrate can be inspected by using these two types of images. The visible light image and the infrared light image contain different information as information for detecting a defect of the substrate. By using these images for the inspection of the substrate, more detailed information about the substrate can be obtained. Thus, according to the substrate inspection apparatus described above, it is possible to obtain an image enabling higher-precision detection of the defect of the substrate.

The substrate inspection apparatus may further include a direction changing unit configured to change the first reflected light and the second reflected light in a same direction. The first imaging sensor may receive the first reflected light whose direction is changed by the direction changing unit, and the second imaging sensor receives the second reflected light whose direction is changed by the direction changing unit.

With the above-described configuration, the layout of the first imaging sensor and the second imaging sensor can be flexibly changed as compared to a case where the direction changing unit is not provided.

The first imaging sensor and the second imaging sensor may be accommodated in a same camera.

By adopting the configuration of using the camera in which the first imaging sensor and the second imaging sensor are accommodated, the visible light image and the infrared light image can be obtained with one camera, so that the substrate inspection apparatus can be suppressed from being scaled up.

The substrate inspection apparatus may further include an incident direction changing unit configured to adjust the visible light from the first light source unit and the infrared light from the second light source unit such that the visible light and the infrared light are incident on the substrate in a same incident direction.

With the above-described configuration, the layout of the first light source unit and the second light source unit can be flexibly changed as compared to a case where the incident direction adjusting unit is not provided.

The visible light incident on the substrate, the infrared light incident on the substrate, the first reflected light emitted from the substrate, and the second reflected light emitted from the substrate may be on a same optical axis.

By adopting the configuration in which the aforementioned four lights lie on the same optical axis, the space in which the optical axes of these lights exist can be reduced. Therefore, since restrictions on the apparatus configuration such as building up an apparatus configuration that does not block the paths of the lights can be reduced, the layout of members other than the optical system can be flexibly changed.

The holder, the first light source unit, the second light source unit, the first imaging sensor, and the second imaging sensor may be accommodated in an imaging unit. The substrate inspection apparatus may further include a controller configured to control the imaging unit to perform capturing of the visible light image by the first imaging sensor and capturing of the infrared light image by the second imaging sensor, and configured to perform an inspection of the substrate by using the visible light image and the infrared light image.

With the above-described configuration, the capturing of the visible light image and the infrared light image and the inspection of the substrate using these images can be comprehensively controlled by the controller.

The holder may be allowed to be moved in a horizontal direction within the imaging unit. Under a control of the controller, the capturing of the visible light image by the first imaging sensor and the capturing of the infrared light image by the second imaging sensor may be performed in parallel while the holder is being moved.

With the above-described configuration, the time required for the capturing of the visible light image and the infrared light image can be shortened, so that the time required for the inspection of the substrate can be reduced.

The controller may detect a defect on the surface of the substrate by comparing the visible light image and the infrared light image.

The information on the defect of the substrate included in the visible light image and the information on the defect of the substrate included in the infrared light image may not be the same but may also include information that is different from each other. Therefore, by adopting the configuration in which the defect is detected by comparing the two images, it becomes possible to detect even a defect that cannot be detected with only one of the images.

The visible light image may be an image obtained by synthesizing multiple types of color component images having different color components. The controller may control a display unit to display an image obtained by synthesizing the infrared light image and at least one of the multiple types of color component images.

With the above-described configuration, since the composite image different from the typical visible light image or infrared light image is displayed in the display unit, a user can check the image of the different type from the visible light image or the infrared light image.

In another exemplary embodiment, a substrate inspection method of inspecting a substrate with an image obtained by imaging a surface of the substrate. The substrate inspection method includes holding the substrate by a holder; emitting visible light from a first light source unit to the substrate held by the holder; emitting infrared light from a second light source unit to the substrate held by the holder; capturing a visible light image of the surface of the substrate by receiving, with a first imaging sensor, first reflected light emitted from the substrate as a result of radiating the visible light; and capturing an infrared light image of the surface of the substrate by receiving, with a second imaging sensor, second reflected light emitted from the substrate as a result of radiating the infrared light.

In this substrate inspection method, since the visible light image of the surface of the substrate is acquired by the first imaging sensor and the infrared light image of the surface of the substrate is acquired by the second imaging sensor, the substrate can be inspected by using these two types of images. The visible light image and the infrared light image contain different information as information for detecting a defect of the substrate. By using these images for the inspection of the substrate, more detailed information about the substrate can be obtained. Thus, according to the substrate inspection apparatus described above, it is possible to obtain an image enabling higher-precision detection of the defect of the substrate.

The substrate inspection method may further include changing the first reflected light and the second reflected light in a same direction by a direction changing unit. In the capturing of the visible light image, the first imaging sensor may receive the first reflected light whose direction is changed by the direction changing unit. In the capturing of the infrared light image, the second imaging sensor may receive the second reflected light whose direction is changed by the direction changing unit.

With the above-described configuration, the layout of the first imaging sensor and the second imaging sensor can be flexibly changed as compared to a case where the change of the direction is not performed by the direction changing unit.

The first imaging sensor and the second imaging sensor may be accommodated in a same camera.

By adopting the configuration of using the camera in which the first imaging sensor and the second imaging sensor are accommodated, the visible light image and the infrared light image can be acquired with one camera, so that a substrate inspection apparatus configured to perform an inspection of the substrate can be suppressed from being scaled up.

The substrate inspection method may further include adjusting the visible light from the first light source unit and the infrared light from the second light source unit by an incident direction adjusting unit such that the visible light from the first light source unit and the infrared light from the second light source unit are incident on the substrate in a same incident direction.

With the above-described configuration, the layout of the first imaging sensor and the second imaging sensor can be flexibly changed as compared to a case where the adjustment by the incident direction adjusting unit is not performed.

The visible light incident on the substrate, the infrared light incident on the substrate, the first reflected light emitted from the substrate, and the second reflected light emitted from the substrate may be on a same optical axis.

By adopting the configuration in which the aforementioned four lights lie on the same optical axis, the space in which the optical axes of these lights exist can be reduced. Therefore, since restrictions on the apparatus configuration such as building up an apparatus configuration that does not block the paths of the lights can be reduced, the layout of members other than the optical system can be flexibly changed.

The holder, the first light source unit, the second light source unit, the first imaging sensor, and the second imaging sensor may be accommodated in an imaging unit. The substrate inspection method may further include controlling, by a controller, the imaging unit to perform the capturing of the visible light image by the first imaging sensor and the capturing of the infrared light image by the second imaging sensor; and performing, by the controller, an inspection of the substrate by using the visible light image and the infrared light image.

With the above-described configuration, the capturing of the visible light image and the infrared light image and the inspection of the substrate using these images can be comprehensively controlled by the controller.

The holder may be allowed to be moved in a horizontal direction within the imaging unit. Under a control of the controller, the capturing of the visible light image by the first imaging sensor and the capturing of the infrared light image by the second imaging sensor may be performed in parallel while the holder is being moved.

With the above-described configuration, the time required for the capturing of the visible light image and the infrared light image can be shortened, so that the time required for the inspection of the substrate can be reduced.

In the performing of the inspection, the controller may detect a defect on the surface of the substrate by comparing the visible light image and the infrared light image.

The information on the defect of the substrate included in the visible light image and the information on the defect of the substrate included in the infrared light image may not be the same but may also include information that is different from each other. Therefore, by adopting the configuration in which the defect is detected by comparing the two images, it becomes possible to detect even a defect that cannot be detected with only one of the images.

The visible light image may be an image obtained by synthesizing multiple types of color component images having different color components. The substrate inspection method may further include controlling, by the controller, a display unit to display an image obtained by synthesizing the infrared light image and at least one of the multiple types of color component images.

With the above-described configuration, since the composite image different from the typical visible light image or infrared light image is displayed in the display unit, a user can check the image of the different type from the visible light image or the infrared light image.

In still another exemplary embodiment, there is provided a recording medium having stored thereon a computer-executable substrate inspection program that, in response to execution, cause a substrate inspection apparatus to perform an inspection of a substrate with an image obtained by imaging a surface of the substrate. The substrate inspection program includes holding the substrate by a holder; emitting visible light from a first light source unit to the substrate held by the holder; emitting infrared light from a second light source unit to the substrate held by the holder; capturing a visible light image of the surface of the substrate by receiving, with a first imaging sensor, first reflected light emitted from the substrate as a result of radiating the visible light; and capturing an infrared light image of the surface of the substrate by receiving, with a second imaging sensor, second reflected light emitted from the substrate as a result of radiating the infrared light.

According to the above-described substrate inspection program, the same effects as obtained by the substrate inspection method can be achieved.

Hereinafter, various exemplary embodiments will be described in detail with reference to the accompanying drawings. Further, in the various drawings, same or corresponding parts will be assigned same reference numerals.

[Substrate Processing System]

A substrate processing system 1 is a system configured to perform formation of a photosensitive film, exposure of the photosensitive film, and development of the photosensitive film on a workpiece W. The workpiece W to be processed is, for example, a substrate or a substrate having a film or a circuit formed thereon after being subjected to a preset processing. The substrate is, for example, a silicon wafer. The workpiece W (substrate) may be of a circular shape. For another example, the workpiece W may be a glass substrate, a mask substrate, or a flat panel display (FPD). The photosensitive film is, by way of example, a resist film.

Figure 2:
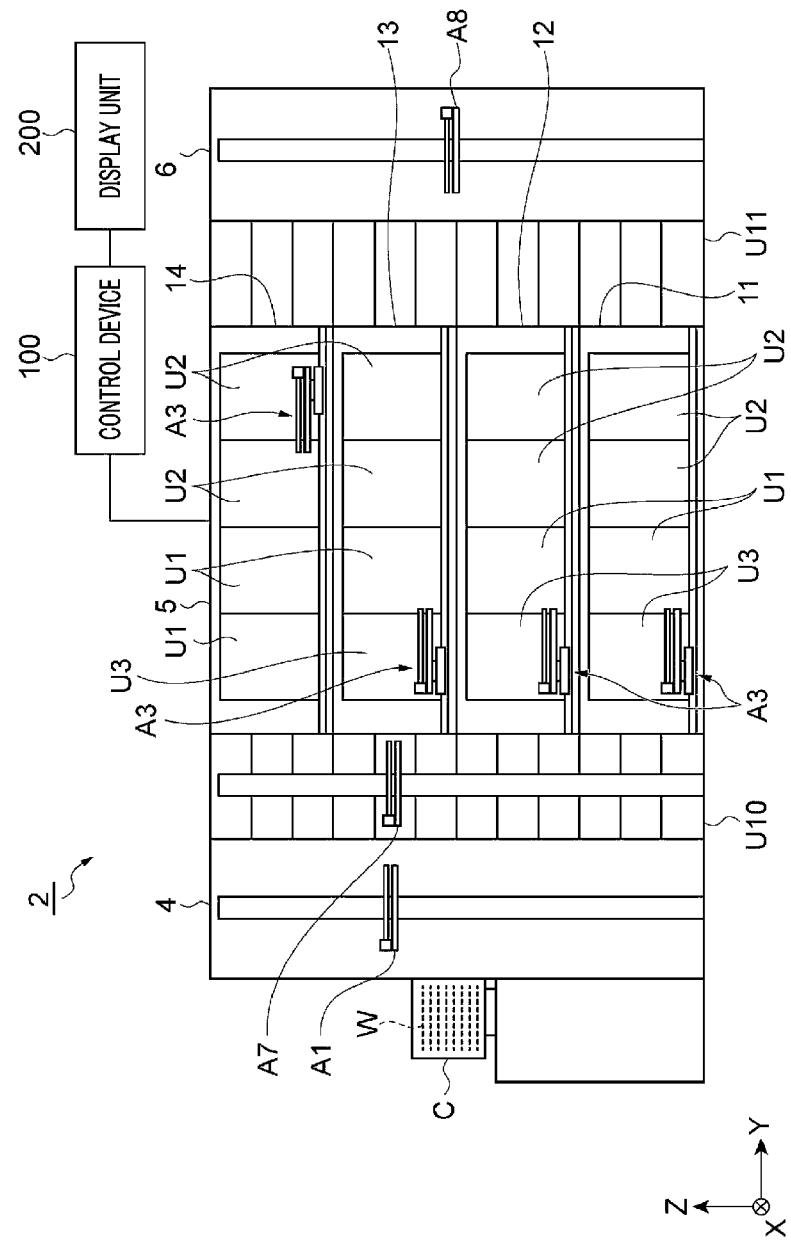
FIG. 2 is a schematic diagram illustrating an example of a coating and developing apparatus.

As illustrated in FIG. 1 and FIG. 2, the substrate processing system 1 includes a coating and developing apparatus 2 and an exposure apparatus 3. The exposure apparatus 3 is configured to perform an exposure process on a resist film (photosensitive film) coated on the workpiece W (substrate). Specifically, the exposure apparatus 3 radiates an energy beam to an exposure target portion of the resist film by a liquid immersion exposure method or the like. The coating and developing apparatus 2 performs a process of coating the resist film on a front surface of the workpiece W (substrate) before the exposure process by the exposure apparatus 3, and then performs a developing process on the resist film after the exposure process. By performing the series of processes, the resist film having a predetermined pattern is formed.

[Substrate Inspection Apparatus]

Hereinafter, a configuration of the coating and developing apparatus 2 as an example of a substrate processing apparatus will be explained. As shown in FIG. 1 and FIG. 2, the coating and developing apparatus 2 is equipped with a carrier block 4, a processing block 5, an interface block 6, and a control device 100 (controller). The control device 100 is connected with a display unit 200. The coating and developing apparatus 2 as a substrate inspection apparatus to be described in the present exemplary embodiment has a function of inspecting a state of a target film formed on the substrate.

The carrier block 4 is configured to perform a carry-in of the workpiece W into the coating and developing apparatus 2 and a carry-out of the workpiece W from the coating and developing apparatus 2. For example, the carrier block 4 is configured to support a plurality of carriers C (accommodating portions) for the workpiece W, and incorporates therein a transfer device A1 including a delivery arm. The carrier C accommodates therein a multiple number of workpieces W having a circular shape, for example. The transfer device A1 takes out the workpiece W from the carrier C, hands the workpiece W over to the processing block 5, receives the workpiece W from the processing block 5, and returns the workpiece W into the carrier C. The processing block 5 has multiple processing modules 11, 12, 13 and 14.

The processing module 11 incorporates therein a plurality of coating units U1, a plurality of heat treatment units U2, a plurality of imaging units U3, and a transfer device A3 configured to transfer the workpiece W to these units. The processing module 11 is configured to form a bottom film on the front surface of the workpiece W by the coating unit U1 and the heat treatment unit U2. The coating unit U1 of the processing module 11 is configured to coat a processing liquid for forming the bottom film on the workpiece W while rotating the workpiece W at a preset rotation speed, for example. The heat treatment unit U2 of the processing module 11 is configured to perform various kinds of heat treatments required to form the bottom film. The heat treatment unit U2 incorporates therein, for example, a heating plate and a cooling plate, and performs a heat treatment by heating the workpiece W to a predetermined heating temperature with the heating plate and cooling the heated workpiece W with the cooling plate. The imaging unit U3 is configured to perform a processing for inspecting a surface state of the workpiece W, and acquires, as information indicating the surface state of the workpiece W, information regarding a surface image, for example.

The processing module 12 incorporates therein a plurality of coating units U1, a plurality of heat treatment units U2, a plurality of imaging units U3, and a transfer device A3 configured to transfer the workpiece W to these units. The processing module 12 is configured to form an intermediate film on the bottom film by the coating unit U1 and the heat treatment unit U2. The coating unit U1 of the processing module 12 is configured to coat a processing liquid for forming the intermediate film on the bottom film, thus forming a coating film on the surface of the workpiece W. The heat treatment unit U2 of the processing module 12 is configured to perform various kinds of heat treatments required to form the intermediate film. The heat treatment unit U2 incorporates therein, for example, a heating plate and a cooling plate, and performs a heat treatment by heating the workpiece W to a predetermined heating temperature with the heating plate and cooling the heated workpiece W with the cooling plate. The imaging unit U3 is configured to perform a processing for inspecting a surface state of the workpiece W, and acquires, as information indicating the surface state of the workpiece W, information regarding a surface image, for example.

The processing module 13 incorporates therein a plurality of coating units U1, a plurality of heat treatment units U2, a plurality of imaging units U3, and a transfer device A3 configured to transfer the workpiece W to these units. The processing module 13 is configured to form a resist film on the intermediate film by the coating unit U1 and the heat treatment unit U2. The coating unit U1 of the processing module 13 is configured to coat a processing liquid for forming the resist film on the intermediate film while rotating the workpiece W at a preset rotation speed, for example. The heat treatment unit U2 of the processing module 13 is configured to perform various kinds of heat treatments required to form the resist film. The heat treatment unit U2 of the processing module 13 forms a resist film by performing, at a predetermined heating temperature, a heat treatment (PAB: Post Applied Bake) on the workpiece W on which the coating film is formed. The imaging unit U3 is configured to perform a processing of inspecting a surface state of the workpiece W, and configured to acquire, as information indicating the surface state of the workpiece W, information regarding a surface image, for example.

The processing module 14 incorporates therein a plurality of coating units U1, a plurality of heat treatment unit U2, and a transfer device A3 configured to transfer the workpiece W to these units. The processing module 14 is configured to perform a developing processing on the exposed resist film R by the coating unit U1 and the heat treatment unit U2. For example, the coating unit U1 of the processing module 14 performs the developing processing on the resist film R by coating a developing liquid on the front surface of the exposed workpiece W while rotating the workpiece W at a predetermined rotation speed and then washing away the coated developing liquid with a rinse liquid. The heat treatment unit U2 of the processing module 14 is configured to perform various kinds of heat treatments required for the developing processing. Specific examples of these heat treatments include a heat treatment (PEB: Post Exposure Bake) before developing processing, a heat treatment (PB: Post Bake) after developing processing, and so forth.

Within the processing block 5, a shelf unit U10 is provided near the carrier block 4. The shelf unit U10 is partitioned into a multiple number of cells arranged in a vertical direction. A transfer device A7 including an elevating arm is provided in the vicinity of the shelf unit 10. The transfer device A7 is configured to move the workpiece W up and down between the cells of the shelf unit U10.

Within the processing block 5, a shelf unit U11 is provided near the interface block 6. The shelf unit U11 is partitioned into a multiple number of cells arranged in the vertical direction.

The interface block 6 is configured to deliver the workpiece W to/from the exposure apparatus 3. By way of example, the interface block 6 incorporates therein a transfer device A8 including a delivery arm and is connected to the exposure apparatus 3. The transfer device A8 is configured to deliver the workpiece W placed in the shelf unit U11 to the exposure apparatus 3, receive the workpiece W from the exposure apparatus 3 and return the workpiece W back into the shelf unit U11.

[Imaging Unit]

The imaging unit U included in the processing modules 11 to 13 will be explained. The imaging unit U3 has a function of obtaining image data by imaging a surface of a film (for example, the bottom film, the intermediate film, the resist film, etc.) formed by the coating unit U1 and the heat treatment unit U2.

Figure 3:
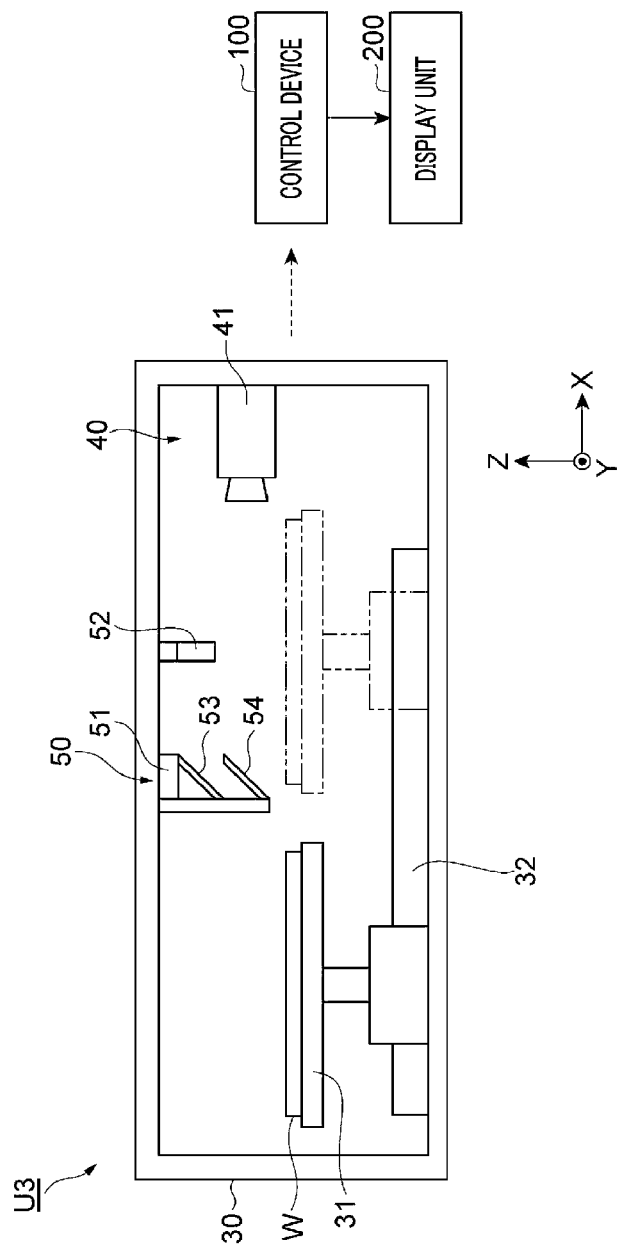
FIG. 3 is a schematic diagram illustrating an example of an imaging unit.

As shown in FIG. 3, the imaging unit U3 includes a housing 30, a holder 31, a linear driving unit 32, an imaging device 40, and a light projecting/reflecting device 50. The holder 31 is configured to hold the workpiece W horizontally. The linear driving unit 32 is configured to move the holder 31 along a horizontal linear path (a path extending in the X-axis direction) by using, for example, an electric motor as a power source.

Figure 4:
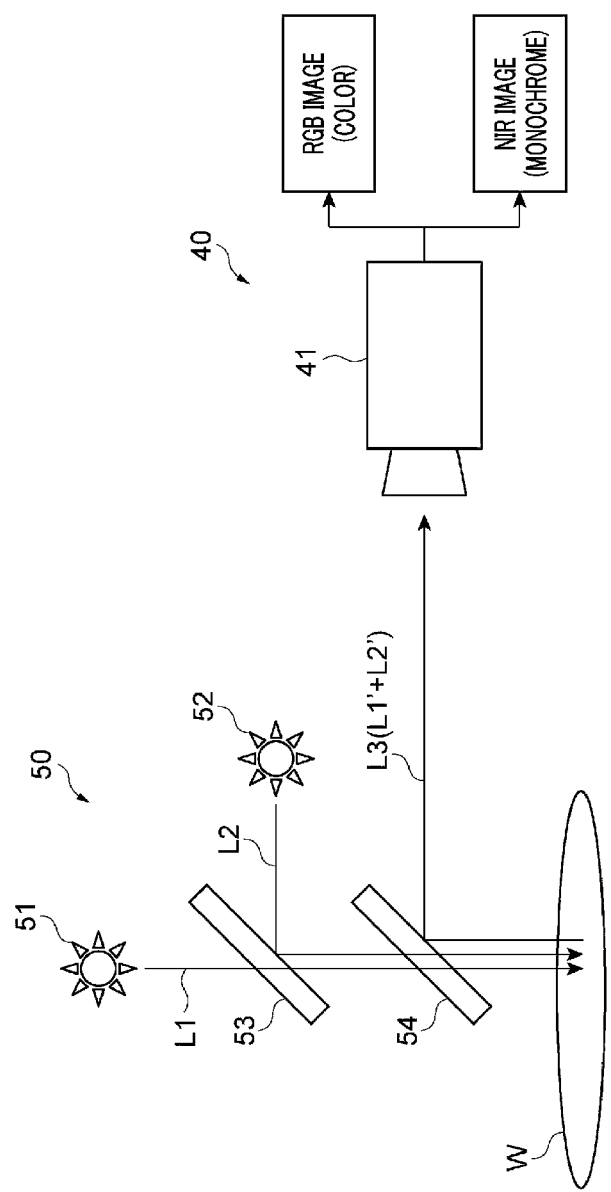
FIG. 4 is a schematic diagram for describing an example of a layout of an imaging device and a light projecting/reflecting device in the imaging unit.

A configuration of the imaging device 40 and the light projecting/reflecting device 50 will also be described with reference to FIG. 4. FIG. 4 is a diagram schematically illustrating a part of the configuration of the imaging device 40 and the light projecting/reflecting device 50 in FIG. 3.

The imaging device 40 has a camera 41. The camera 41 is provided at one end side within the imaging unit U3 in a moving direction (X-axis direction) of the holder 31, and is oriented toward the other end side of the moving direction. One having sensitivity to a visible light range with a wavelength of 380 nm to 780 nm and an infrared light range with a wavelength equal to or larger than 780 nm is used as the camera 41. Even within the infrared light range, one having sensitivity to a near-infrared light range with a wavelength of 780 nm to 1000 nm may be properly used as the camera 41.

Specifically, one capable of separating the visible light range into three wavelength ranges and also capable of separating the visible light range and the near-infrared light range may be used as the camera 41. As a specific configuration of the camera 41, a 4-line-color line scan camera in which four types of sensors (for example, CMOS sensors, etc.) of RGB and NIR are disposed on a line may be used. The R sensor, the G sensor, and the B sensor correspond to a sensor (first imaging sensor) having sensitivity to visible light, and the NIR sensor corresponds to a sensor (second imaging sensor) having sensitivity to infrared light (near infrared light).

Each of the four types of sensors may be arranged so as to extend along a horizontal direction and in a direction (Y-axis direction) orthogonal to the moving direction of the holder 31.

The light projecting/reflecting device 50 is configured to project light to an imaging target range and guide reflected light from the imaging target range toward the camera 41. For example, the light projecting/reflecting device 50 includes a first light source unit 51, a second light source unit 52, an optical filter 53, and a half mirror 54.

The first light source unit 51 is a light source configured to emit visible light, and has a function of emitting the visible light toward the optical filter 53 below. Although the wavelength range of the visible light emitted from the first light source unit 51 is not particularly limited, white light including the whole wavelength range of the visible light or light similar thereto may be used as an example. The second light source unit 52 has a function of emitting the near-infrared light of a single wavelength as a kind of the infrared light. The second light source unit 52 is provided on a level with the optical filter 53 in a vertical direction, and has a function of emitting the near-infrared light toward the optical filter 53 in the moving direction (X-axis direction) of the holder 31. Although the wavelength range of the near-infrared light emitted from the second light source unit 52 is not particularly limited, light having a single wavelength of 850 nm may be used as an example.

Each of the first light source unit 51 and the second light source unit 52 is an elongated line light source extending in the horizontal direction and in the direction (Y-axis direction) orthogonal to the moving direction of the holder 31, and is disposed within the housing 30. The lengths of the first light source unit 51 and the second light source unit 52 in a longitudinal direction are larger than the diameter of the workpiece W.

The optical filter 53 has a function of guiding the lights from the first light source unit 51 and the second light source unit 52 toward the half mirror 54 from a position higher than the half mirror 54. The optical filter 53 corresponds to an incident direction adjusting unit configured to adjust the direction of light incident on the workpiece W. The optical filter 53 is disposed in the housing 30 with an inclination of approximately 45 degrees with respect to the horizontal direction. The optical filter 53 is positioned above a middle portion of the holder 31 so as to be orthogonal to the moving direction (X-axis direction) of the holder 31 when viewed from above. The optical filter 53 has a rectangular shape. The length (length in the longitudinal direction) of the optical filter 53 is larger than the diameter of the workpiece W.

Figure 5:
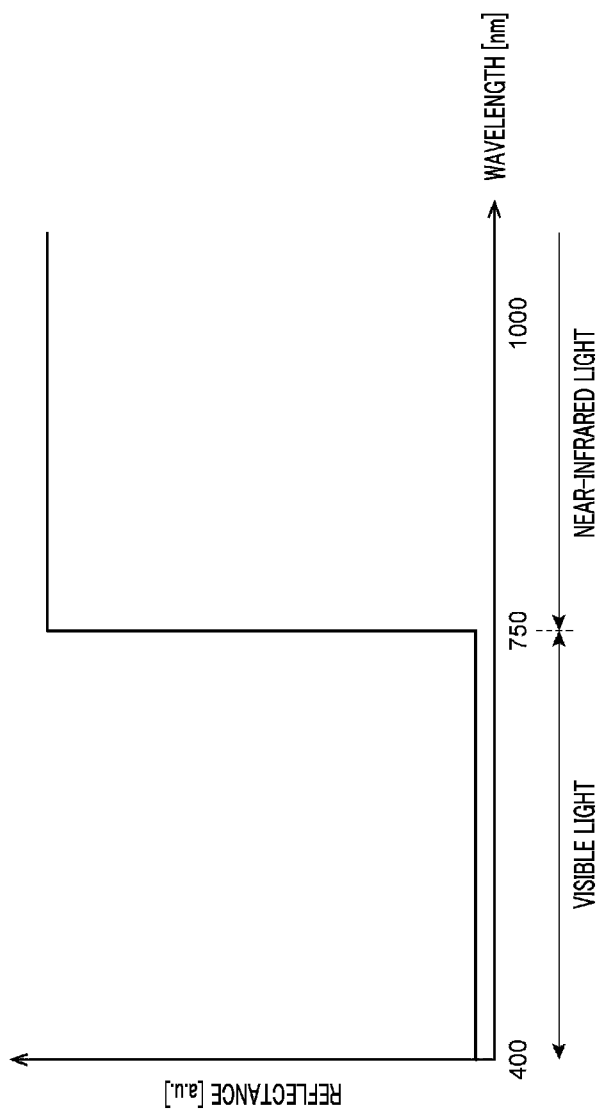
FIG. 5 is a diagram illustrating an example of optical characteristics of an optical filter.

FIG. 5 schematically shows optical characteristics of the optical filter 53. The optical filter 53 does not reflect light having a wavelength of 750 nm or less in the so-called visible light range, but it reflects almost 100% of light having a wavelength of 750 nm or more in the so-called near-infrared light range. Therefore, as shown in FIG. 4, if the inclination of the optical filter 53 is set so that the light emitted from the second light source unit 52 is reflected and directed downwards, the light from the second light source unit 52 can be guided to the workpiece W. At this time, the positions of the first light source unit 51, the second light source unit 52 and the optical filter 53 are set such that the reflection position of the near-infrared light from the second light source unit 52 overlap the optical axis of the light from the first light source unit 51. With this configuration, as illustrated in FIG. 4, both visible light L1 and near infrared light L2 reach the half mirror 54 through the same optical axis (intentionally shifted slightly in FIG. 4).

At a position below the optical filter 53 and higher than the holder 31, the half mirror 54 has a function of transmitting light from the optical filter 53 and reflecting light from below toward the camera 41. The half mirror 54 corresponds to a direction changing unit configured to change the direction of reflected light from the workpiece W.

The half mirror 54 is disposed in the housing 30 with an inclination of approximately 45 degrees with respect to the horizontal direction. The half mirror 54 is positioned so as to be orthogonal to the moving direction (X-axis direction) of the holder 31 and to overlap the optical filter 53 when viewed from above. The half mirror 54 has a rectangular shape. The length (length in the longitudinal direction) of the half mirror 54 is larger than the diameter of the workpiece W.

The imaging unit U3 operates as follows to acquire image data of a surface of the workpiece W. First, the linear driving unit 32 moves the holder 31. Accordingly, the workpiece W passes under the half mirror 54. In this passing process, the visible light L1 emitted downwards from the first light source unit 51 passes through the optical filter 53 and the half mirror 54 in overall and is radiated downwards (toward the linear driving unit 32). Further, the near-infrared light L2 emitted in the horizontal direction from the second light source unit 52 changes its path downwards by being reflected by the optical filter 53, passes through the half mirror 54 in overall, and is then radiated downwards (toward the linear driving unit 32). As described above, when the light sources and the optical filter 53 are set such that the optical axes of the lights from the first light source unit 51 and the second light source unit 52 are coincident, the lights L1 and L2 illuminate the same radiation area.

The visible light L1 and the near infrared light L2 having passed through the half mirror 54 are reflected by an object (workpiece W) positioned under the half mirror 54. That is, reflected light L3 may include reflected light L1' (first reflected light) of the visible light L1 and reflected light L2' (second reflected light) of the near-infrared light L2. The reflected light L3 is reflected again by the half mirror 54, passes through a lens of the camera 41, and is incident on an imaging element of the camera 41. That is, the camera 41 is capable of imaging an object existing in the radiation area of the first light source unit 51 and the second light source unit 52 through the half mirror 54. For example, when the holder 31 holding the workpiece W is moved, the camera 41 is capable of imaging the surface of the workpiece W passing through the radiation area of the first light source unit 51 and the second light source unit 52. If the state (for example, a film thickness, a line width, a defect, etc.) of the film formed on the surface of the workpiece W changes, the image data of the surface of the workpiece W imaged by the camera 41 is changed. For example, the color of the surface of the workpiece W may be changed according to a change in shape.

The image data acquired by the camera 41 is sent to the control device 100. In the control device 100, a shape characteristic value of the film on the surface of the workpiece W can be estimated based on the image data, and the estimation result is stored in the control device 100 as an inspection result. Further, the image data is also stored in the control device 100.

Typically, in the control device 100, one RGB image (color image) is formed based on pixel information obtained from each of the R, G, and B sensors, and one NIR image (monochrome image) is formed based on pixel information obtained from the NIR sensor. The R sensor, the G sensor, the B sensor, and the NIR sensor are sensors having sensitivity to different wavelength ranges. However, the composition of the images outputted to the display unit 200 may be changed under the control of the control device 100, which will be discussed later.

The display unit 200 connected to the control device 100 is, for example, a monitor. The monitor may not be particularly limited as long as it is capable of displaying information on a screen. As a specific example, a liquid crystal panel or the like may be used. The display unit 200 may have a function of displaying the content of the control by the control device 100. In addition, the display unit 200 may have a function of processing and displaying the image captured by the imaging unit U3 based on a user's instruction, or the like. This point will be discussed later.

[Control Device]

An example of the control device 100 will be described in detail. The control device 100 controls the individual components included in the coating and developing apparatus 2. The control device 100 is configured to implement a process including forming each of the above-described films on the front surface of the workpiece W and performing the developing processing. In addition, the control device 100 is configured to implement a process of inspecting the front surface of the workpiece W and displaying the result. Here, in the coating and developing apparatus 2, a configuration example of the control device 100 as a substrate inspection apparatus configured to perform a substrate inspection will be described.

Figure 6:
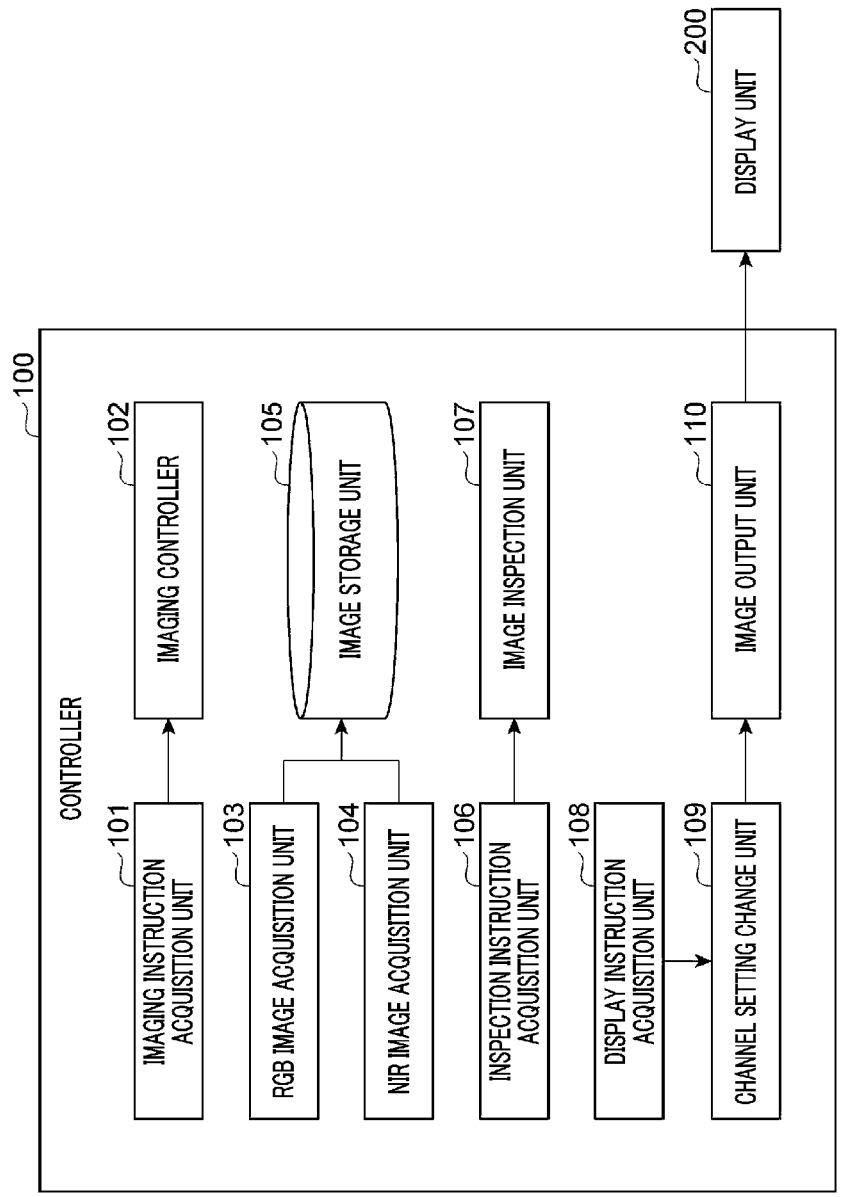
FIG. 6 is a block diagram illustrating an example of a functional configuration of a control device.

As depicted in FIG. 6, the control device 100 has, as functional components, an imaging instruction acquisition unit 101, an imaging controller 102, an RGB image acquisition unit 103, an NIR image acquisition unit 104, an image storage unit 105, an inspection instruction acquisition unit 106, an image inspection unit 107, a display instruction acquisition unit 108, a channel setting change unit 109, and an image output unit 110.

The imaging instruction acquisition unit 101 has a function of acquiring an instruction regarding the imaging of the workpiece W in the imaging unit U3. The instruction may be given by, for example, a user of the coating and developing apparatus 2. Further, the imaging instruction in the imaging unit U3 may actually be the execution of a previously prepared program regarding a substrate processing of the workpiece W.

The imaging controller 102 has a function of performing, based on the instruction acquired in the imaging instruction acquisition unit 101, a control for imaging the surface of the workpiece W after being processed in the imaging unit U3.

The RGB image acquisition unit 103 has a function of acquiring an RGB image of the surface of the workpiece W from the camera 41 of the imaging unit U3. Specifically, the pixel information obtained from the three types of sensors (the R, G and B sensors) of the camera 41 is acquired.

The NIR image acquisition unit 104 has a function of acquiring an NIR image of the surface of the workpiece W from the camera 41 of the imaging unit U3. Specifically, the pixel information obtained from the NIR sensor of the camera 41 is acquired.

The image storage unit 105 has a function of storing the images acquired by the RGB image acquisition unit 103 and the NIR image acquisition unit 104. The image information stored in the image storage unit 105 is used for the inspection of the workpiece W. In addition, the image information may also be used for the display in the display unit 200 based on the user's instruction or the like.

The inspection instruction acquisition unit 106 has a function of acquiring an instruction regarding the inspection of the workpiece W based on the image of the workpiece W captured by the imaging unit U3. The instruction may be given by, for example, the user of the coating and developing apparatus 2. Further, the instruction regarding the inspection may actually be the execution of the previously prepared program regarding the substrate processing of the workpiece W.

The image inspection unit 107 has a function of performing, based on the instruction acquired in the inspection instruction acquisition unit 106, a control for carrying out the inspection of the workpiece W using the image of the workpiece W. The inspection of the workpiece W using the image refers to an inspection of presence or absence of a defect in the workpiece W. As described above, when the film formed on the workpiece W has a defect, there may be a change in the captured image. Further, information included in the visible light image (RGB image) and the near-infrared light image (NIR image) may be changed. Therefore, in the image inspection unit 107, the presence or absence of the defect in the workpiece W is inspected in detail by using the visible light image and the near-infrared light image.

As an example of the inspection of the defect of the workpiece W using the image, an inspection through the comparison of the visible light image and the near-infrared light image may be carried out. With the visible light image, it is generally possible to observe a change in the surface of the workpiece W in detail. Meanwhile, since the near-infrared light can be reflected at an inner surface of the workpiece W as compared to the visible light, the near-infrared light image becomes an image showing information of an inner layer of the workpiece W rather than the surface thereof. Therefore, by observing the near-infrared light image, it is possible to find a defect present at a portion other than the surface of the workpiece W, which cannot not be observed conventionally. Furthermore, by comparing the visible light image and the near-infrared light image, it becomes also possible to specify, for example, whether or not color unevenness included only in the visible light image is derived from a defect in the surface layer.

The display instruction acquisition unit 108 has a function of acquiring an instruction regarding the display of an image in the display unit 200. The instruction may be given by, for example, the user of the coating/developing apparatus 2. Further, an instruction of changing the content of the display may be acquired as a part of the inspection instruction.

The channel setting change unit 109 has a function of setting a channel to be connected to the display unit 200 in order to output an image in the display unit 200 based on the instruction acquired by the display instruction acquisition unit 108.

Figures 7A, 7B:
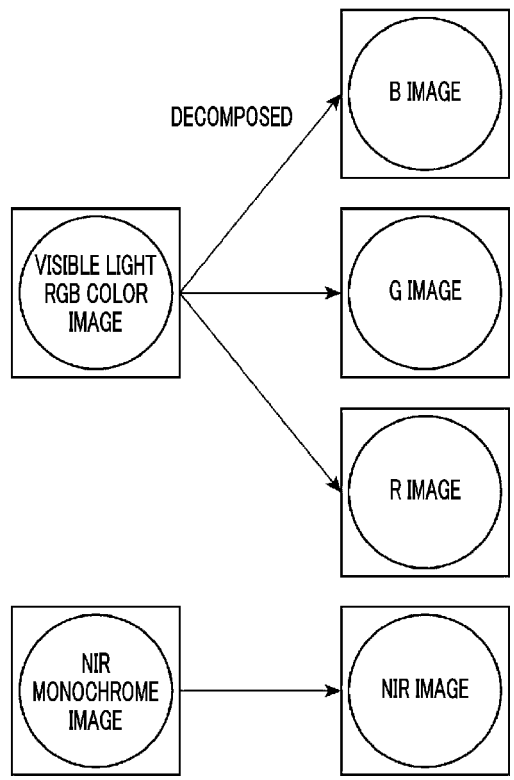
FIG. 7A is a diagram for describing an example of an image obtained in the control device.
FIG. 7B is a diagram for describing an example of a method of creating a pseudo RGB image.

A change of the channel setting in the channel setting change unit 109 will be described with reference to FIG. 7A and FIG. 7B. FIG. 7A describes how the visible light image (RGB image) acquired by the RGB image acquisition unit 103 and the near-infrared light image (NIR image) acquired by the NIR image acquisition unit 104 are configured.

As described above, the RGB image is a color image created by synthesizing the pixel information from the three types of sensors (R sensor, G sensor, and B sensor). When displaying an image in the display unit 200, the pixel information of each sensor is assigned to one channel (ch), and the image is outputted by combining them. That is, when the RGB image is outputted in the display unit 200, images of the three channels are outputted while being overlapped with each other. In other words, the RGB image can be decomposed into three color images: an R image by the R sensor, a G image by the G sensor, and a B image by the B sensor.

Meanwhile, since the NIR image is obtained by planarizing the pixel information from the single type of sensor (NIR sensor), it cannot be decomposed, unlike the RGB image described above. Therefore, when displaying the NIR image in the display unit 200, it is desirable to allocate the pixel information of the NIR sensor to one channel.

In this way, the pixel information from the four types of sensors is acquired in the camera 41. Meanwhile, when an image is displayed in the display unit 200, images of one to three channels can be combined. Therefore, by changing the types of images to be allocated to the three channels, an image synthesized in a manner different from a typical RGB image can be generated and displayed as a pseudo RGB image.

FIG. 7B shows example combinations of image types allocated to respective channels when an image to be displayed in the display unit 200 is generated by using three channels (1 ch to 3 ch). FIG. 7B shows all combination examples in the case of allocating any one of the images (R image, G image, B image, and NIR image) captured by the four types of sensors to all of the three channels (1 ch to 3 ch). By changing the type of the images allocated to the channels in this way, different images (output images 1 to 4) can be displayed in the display unit 200. The channel setting change unit 109 has a function of determining which image taken by which sensor is to be assigned to the three channels in the display unit 200. In addition, when generating an image to be displayed in the display unit 200, all of the three channels may not be used. By way of example, an output image may be generated by using only two channels out of the three channels.

The image output unit 110 has a function of selecting image information to be displayed in the display unit 200 from the information stored in the image storage unit 105 based on the settings in the channel setting change unit 109 and outputting the image to each channel of the display unit 200. As a result, in the display unit 200, the images assigned to the three channels can be synthesized, and the one pseudo RGB image can be displayed.

By creating such a pseudo RGB image and displaying it in the display unit 200, it becomes possible for the user to obtain information that is not recognized in a typical RGB image or NIR image. For example, when inspecting a defect related to a film of a specific workpiece W, it may be difficult to detect the defect from an image related to a specific wavelength range due to, for example, a color of the workpiece W. In such a case, by excluding the image related to the wavelength range in which the defect is difficult to detect, the remaining three images may be synthesized and displayed in the display unit 200 as the pseudo RGB images, thus allowing the user to determine presence or absence of the defect of the workpiece W more easily with naked eyes.

Further, the pseudo RGB image may be used to inspect the workpiece W. That is, in addition to the comparison between the visible light image and the near-infrared light image, a comparison between the pseudo RGB image and the visible light image or a comparison between the pseudo RGB image and the near-infrared light image may be performed to inspect the defect of the workpiece W.

Figure 8:
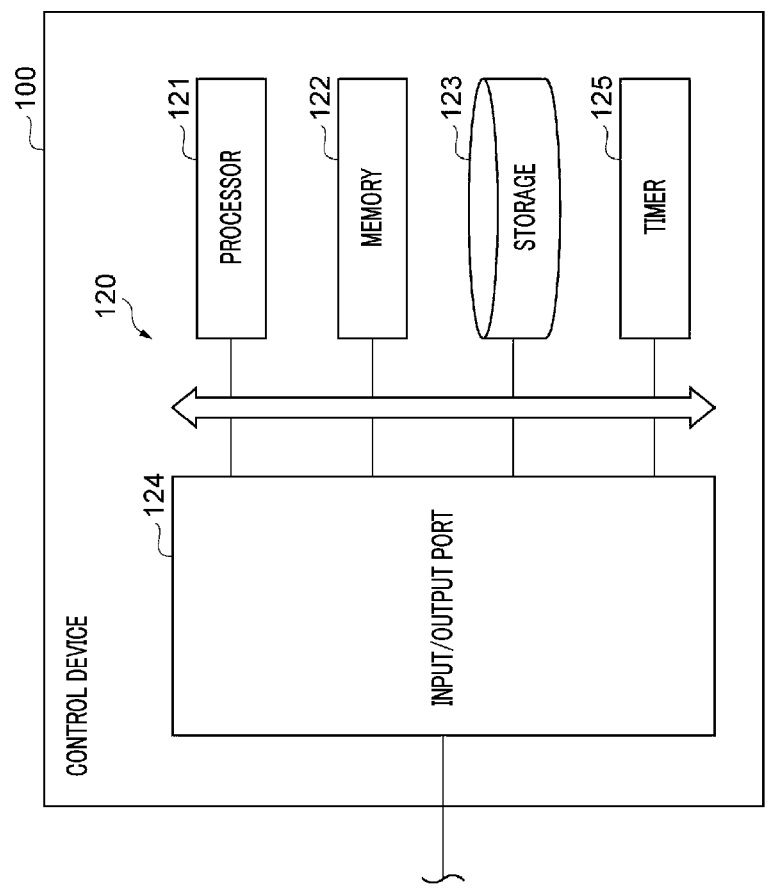
FIG. 8 is a block diagram illustrating an example of a hardware configuration of the control device.

The control device 100 is composed of one or more control computers. For example, the control device 100 has a circuit 120 shown in FIG. 8. The circuit 120 includes one or more processors 121, a memory 122, a storage 123, and an input/output port 124. The storage 123 has a computer-readable recording medium such as, but not limited to, a hard disk. The recording medium stores therein a program for causing the control device 100 to execute a substrate inspection sequence to be described later. The recording medium may be a removable medium such as a nonvolatile semiconductor memory, a magnetic disk, or an optical disk. The memory 122 temporarily stores therein the program loaded from the recording medium of the storage 123 and a calculation result by the processor 121. The processor 121 executes the program in cooperation with the memory 122, thereby configuring each of the above-described functional modules. The input/output port 124 performs an input/output of electrical signals with respect to a member as a control target in response to a command from the processor 121.

In addition, the hardware configuration of the control device 100 is not limited to constituting the individual functional modules by the program. By way of example, each functional module of the control device 100 may be implemented by a dedicated logic circuit or an ASIC (Application Specific Integrated Circuit) which is an integration of logic circuits.

Although the following exemplary embodiment will be described for the case where the above-described components are included in the control device 100, the control device 100 does not have to include all of the above-described functions. For example, a functional component as a database such as the image storage unit 105 may be provided in an external device.

Furthermore, the control device 100 and the display unit 200 may be connected to the carrier block 4, the processing block 5 and the interface block 6 in the coating and developing apparatus 2 via a wired or wireless network. That is, the control device 100 may be provided at a position spaced apart from a block that actually processes the workpiece W in the coating and developing apparatus 2.

[Processing Sequence]

Now, a processing sequence performed by the coating and developing apparatus 2 will be discussed.

In the processing sequence, first, the control device 100 controls the transfer device A1 to transfer the workpiece W as a processing target in the carrier C to the shelf unit U10, and then controls the transfer device A7 to place this workpiece W in the cell for the processing module 11.

Next, the control device 100 controls the transfer device A3 to transfer the workpiece W of the shelf unit U10 to the coating unit U1 and the heat treatment unit U2 within the processing module 11. Further, the control device 100 controls the coating unit U1 and the heat treatment unit U2 to form the bottom film on the front surface of the workpiece W. Thereafter, the control device 100 controls the transfer device A3 to return the workpiece W having the bottom film formed thereon to the shelf unit U10, and controls the transfer device A7 to place this workpiece W in the cell for the processing module 12.

Subsequently, the control device 100 controls the transfer device A3 to transfer the workpiece W of the shelf unit U10 to the coating unit U1 and the heat treatment unit U2 within the processing module 12. Further, the control device 100 controls the coating unit U1 and the heat treatment unit U2 to form the intermediate film on the bottom film of the workpiece W. For example, the control device 100 controls the coating unit U1 to coat the processing liquid for forming the intermediate film on the bottom film of the workpiece W to form the intermediate film. Then, the control device 100 controls the heat treatment unit U2 to perform a heat treatment on the intermediate film. After the formation of the intermediate film, the control device 100 controls the transfer device A3 to transfer the workpiece W to the imaging unit U3, and controls the imaging unit U3 to image the front surface of the workpiece W to acquire image information (basic image). Thereafter, the control device 100 controls the transfer device A3 to return the workpiece W to the shelf unit U10, and controls the transfer device A7 to place this workpiece W in the cell for the processing module 13.

Subsequently, the control device 100 controls the transfer device A3 to transfer the workpiece W of the shelf unit U10 to each unit within the processing module 13, and controls the coating unit U1 and the heat treatment unit U2 to form the resist film on the intermediate film of the workpiece W. For example, the control device 100 controls the coating unit U1 to coat the processing liquid for forming the resist film onto the intermediate film of the workpiece W to form the resist film. Next, the control device 100 controls the heat treatment unit U2 to perform a heat treatment on the resist film. After the formation of the resist film, the control device 100 controls the transfer device A3 to transfer the workpiece W to the imaging unit U3, and controls the imaging unit U3 to image the front surface of the workpiece W to acquire image information (image after processing). Thereafter, the control device 100 controls the transfer device A3 to transfer the workpiece W to the shelf unit U11.

Next, the control device 100 controls the transfer device A8 to send the workpiece W of the shelf unit U11 to the exposure apparatus 3. Thereafter, the control device 100 controls the transfer device A8 to receive the exposed workpiece W from the exposure apparatus 3 and place it in the cell for the processing module 14 in the shelf unit U11.

Afterwards, the control device 100 controls the transfer device A3 to transfer the workpiece W of the shelf unit U11 to each unit within the processing module 14, and controls the coating unit U1 and the heat treatment unit U2 to perform the developing processing on the resist film R of the workpiece W. Thereafter, the control device 100 controls the transfer device A3 to return the workpiece W to the shelf unit U10, and controls the transfer device A7 and the transfer device A1 to return the workpiece W to the carrier C. Through these operations, the processing is completed.

[Substrate Inspection Method]

Figure 9:
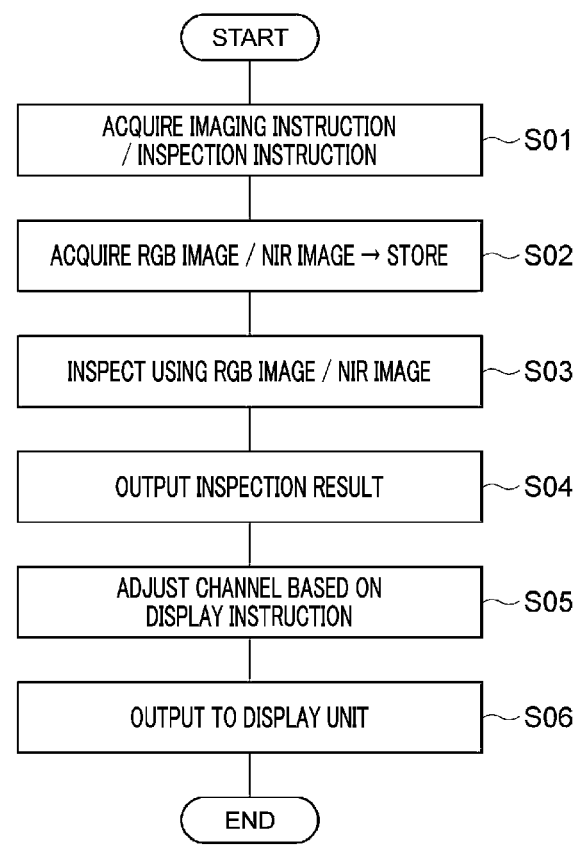
FIG. 9 is a flowchart illustrating an example of a substrate inspection method.

Referring to FIG. 9, a substrate inspection method performed under the control of the control device 100 of the coating and developing apparatus 2 will be described.

First, the control device 100 performs a process S01. In the process S01, the imaging instruction acquisition unit 101 acquires an imaging instruction, and the inspection instruction acquisition unit 106 acquires an inspection instruction. Here, it is assumed that the control device 100 acquires a series of instructions related to the substrate processing including the inspection of the workpiece W. In this case, the control device 100 needs to obtain the imaging instruction and the inspection instruction.

Next, the control device 100 performs a process S02. In the process S02, the imaging controller 102 controls the imaging unit U3 and performs imaging by the camera 41. The visible light image (RGB image) and the near-infrared light image (NIR image), which are imaging results, are acquired by the RGB image acquisition unit 103 and the NIR image acquisition unit 104, respectively, and are stored in the image storage unit 105.

Then, the control device 100 performs a process S03. In the process S03, the image inspection unit 107 performs an inspection for a defect on the surface of the workpiece W by using the visible light image and the near-infrared light image stored in the image storage unit 105. At this time, the aforementioned pseudo RGB image may also be used for the inspection.

Subsequently, the control device 100 performs a process S04. In the process S04, the image inspection unit 107 outputs an inspection result. The display unit 200 may be an example of an output destination to which the inspection result is outputted. Alternatively, however, the inspection result may be outputted to an external device different from the display unit 200.

Thereafter, the control device 100 performs a process S05. In the process S05, the channel setting change unit 109 performs allocation of images to the channels of the display unit 200 based on a display instruction to display the images in the display unit 200, which is acquired by the display instruction acquisition unit 108.

Next, the control device 100 performs a process S06. In the process S06, the image output unit 110 outputs an image to the display unit 200 based on the content of setting set by the channel setting change unit 109 as well.

In FIG. 9, although the series of processes have been described in the order of S01 to S09, the processes S01 to S04 and the processes S05 and S06 may be performed independently. Also, the timing of performing the processes S01 and S02 and the timing of performing the processes S03 and S04 may be independent from each other. Alternatively, the acquisition of the inspection instruction described in the process SO1 may be performed at a timing different from the process S01, and this acquisition of the inspection instruction may serve as a trigger for performing the process S03. In this way, the order of processes shown in FIG. 9 may be changed appropriately.

[Operations]

In the coating/developing apparatus 2 corresponding to the substrate inspection apparatus and the substrate inspection method described above, the visible light image of the surface of the substrate is acquired by the visible light sensor (RGB sensor) as the first imaging sensor, and the infrared light image of the surface of the substrate is acquired by the second imaging sensor (NIR sensor). Therefore, the substrate can be inspected by using these two types of images. The visible light image and the infrared light image contain different information as information for detecting the defect of the substrate. Thus, by using these images in the inspection, more detailed information about the substrate can be obtained. Hence, by adopting the above-described configuration, it is possible to acquire an image enabling higher-precision detection of the defect of the substrate.

In particular, the infrared light image can be effective when a processing film formed on the substrate is a thick film (on the order of several micrometers (μm)). In the visible light image, since a defect other than surface irregularities is difficult to detect especially when the thickness of the processing film is large, it becomes difficult to detect a defect such as a striation, film unevenness or a comet, which is difficult to detect through the surface irregularities. Meanwhile, with the infrared light image, a change in the film other than the surface irregularities can be detected. Therefore, by combining the visible light image and the infrared light image, information on a wider variety of defects can be obtained, so that it becomes possible to detect a defect that cannot be detected only with the visible light image.

Here, the half mirror 54 as the direction changing unit configured to change the first reflected light L1' and the second reflected light L2' (i.e., the reflected light L3) in the same direction may be further provided. Moreover, the first imaging sensor may receive the first reflected light L1' whose direction is changed by the half mirror 54, and the second imaging sensor may receive the second reflected light L2' whose direction is likewise changed by the half mirror 54. With this configuration, the layout of the first imaging sensor and the second imaging sensor can be flexibly changed as compared to a case where the direction changing unit is not provided.

The first imaging sensor and the second imaging sensor may be accommodated in the same camera 41. With this configuration, since the visible light image and the infrared light image can be acquired with one camera, enlargement of the substrate inspection apparatus can be suppressed.

The optical filter 53 as the incident direction adjusting unit configured to adjust the visible light L1 from the first light source unit and the near-infrared light L2 (infrared light) from the second light source unit such that they are incident on the substrate in the same incident direction may be further provided. With this configuration, the layout of the first light source unit and the second light source unit can be flexibly changed as compared to a case where the incident direction adjusting unit is not provided.

The visible light L1 incident on the substrate, the near-infrared light L2 incident on the substrate, the first reflected light L1' emitted from the substrate, and the second reflected light L2' emitted from the substrate may be on the same optical axis. With this configuration, the space in which the optical axes of these lights exist can be made small. Therefore, since restrictions on the apparatus configuration such as building up an apparatus configuration that does not block the paths of the lights can be reduced, the layout of members other than the optical system can be flexibly changed.

The holder, the first light source unit, the second light source unit, the first imaging sensor, and the second imaging sensor may be accommodated in the single imaging unit U3. Further, the control device 100 as a controller may control the imaging unit U3 to perform capturing of the visible light image and capturing of the infrared light image. Further, the controller may perform a control to carry out an inspection of the substrate by using the visible light image and the infrared light image. With this configuration, the capturing of the visible light image and the infrared light image and the inspection of the substrate by using these images can be comprehensively controlled by the controller.

The holder 31 may be configured to be movable in the horizontal direction within the imaging unit U3. Further, under the control of the controller, the capturing of the visible light image and the capturing of an infrared light image may be performed in parallel while the holder 31 is being moved. With this configuration, the time required for the capturing of the visible light image and the infrared light image can be shortened, so that the time required for the inspection of the substrate can be reduced.

Further, the controller may detect a defect on the surface of the substrate by comparing the visible light image and the infrared light image. The information on the defect of the substrate included in the visible light image and the information on the defect of the substrate included in the infrared light image may not be the same but may also include information that is different from each other. Therefore, by adopting the configuration in which the defect is detected through the comparison of the two images, it becomes possible to detect even a defect which cannot be detected with only one of the images.

In addition, the visible light image is an image obtained by synthesizing multiple types of color component images having different color components, and the controller may control the display unit to display an image obtained by synthesizing the infrared light image and at least one of the multiple types of color component images. For example, as described in the above exemplary embodiment, a pseudo RGB image may be displayed in the display unit 200. With this configuration, since the composite image different from the typical visible light image or infrared light image is displayed in the display unit, a user can check the image of the different type from the visible light image or the infrared light image.

MODIFICATION EXAMPLES

So far, the various exemplary embodiments have been described. However, the exemplary embodiments are not limiting, and various omissions, substitutions and changes may be made. Further, other exemplary embodiments may be embodied by combining elements in the various exemplary embodiments in a variety of other forms.

For example, the above exemplary embodiment has been described for the case where the near-infrared light image is captured as an infrared light image. However, without being limited to the wavelength range of the near-infrared light from about 780 mm to about 2 μm, infrared light having a wavelength larger than 2 μm may be used.

Moreover, the above exemplary embodiment has been described for the case where both the visible light image and the near-infrared light image are simultaneously captured in the single imaging unit U3, while moving the workpiece W. Instead of this configuration, however, the visible light image and the near-infrared light image may be captured sequentially. Further, the layout of the light source units and the camera within the imaging unit U3 may be appropriately changed. In addition, the number and the layout of optical elements for adjusting the paths of the lights, such as the optical filter 53 and the half mirror 54, may be appropriately changed according to the layout of the light sources and the camera.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting. The scope of the inventive concept is defined by the following claims and their equivalents rather than by the detailed description of the exemplary embodiments. It shall be understood that all modifications and embodiments conceived from the meaning and scope of the claims and their equivalents are included in the scope of the inventive concept.

According to the exemplary embodiment, it is possible to provide the technique of acquiring the image from which the defect of the substrate can be detected with higher precision.

We claim:

1. A substrate inspection apparatus configured to inspect a substrate with an image obtained by imaging a surface of the substrate, the substrate inspection apparatus comprising:
   a holder configured to hold the substrate and to be moved in a horizontal direction;
   a first light source unit configured to emit visible light to the substrate held by the holder;
   a second light source unit configured to emit infrared light to the substrate held by the holder;
   a first imaging sensor configured to capture a visible light image of the surface of the substrate by receiving first reflected light emitted from the substrate as a result of radiating the visible light;
   a second imaging sensor configured to capture an infrared light image of the surface of the substrate by receiving second reflected light emitted from the substrate as a result of radiating the infrared light; and
   a controller configured to perform an inspection of the substrate by using the visible light image and the infrared light image, by capturing the visible light image with the first imaging sensor and capturing the infrared light image with the second imaging sensor in parallel as the holder is moving, thereby reducing a capture time of the first and second imaging sensors.

2. The substrate inspection apparatus of claim 1, further comprising:
   a direction changing unit configured to change the first reflected light and the second reflected light in a same direction,
   wherein the first imaging sensor receives the first reflected light whose direction is changed by the direction changing unit, and
   the second imaging sensor receives the second reflected light whose direction is changed by the direction changing unit.

3. The substrate inspection apparatus of claim 1,
   wherein the first imaging sensor and the second imaging sensor are accommodated in a same camera.

4. The substrate inspection apparatus of claim 1, further comprising:
   an incident direction changing unit configured to adjust the visible light from the first light source unit and the infrared light from the second light source unit such that the visible light and the infrared light are incident on the substrate in a same incident direction.

5. The substrate inspection apparatus of claim 1,
   wherein the visible light incident on the substrate, the infrared light incident on the substrate, the first reflected light emitted from the substrate, and the second reflected light emitted from the substrate are on a same optical axis.

6. The substrate inspection apparatus of claim 1,
   wherein the holder, the first light source unit, the second light source unit, the first imaging sensor, and the second imaging sensor are accommodated in an imaging unit.

7. The substrate inspection apparatus of claim 1,
   wherein the controller detects a defect on the surface of the substrate by comparing the visible light image and the infrared light image.

8. The substrate inspection apparatus of claim 1,
   wherein the visible light image is an image obtained by synthesizing multiple types of color component images having different color components, and
   the controller controls a display unit to display an image obtained by synthesizing the infrared light image and at least one of the multiple types of color component images.

9. A substrate inspection method of inspecting a substrate with an image obtained by imaging a surface of the substrate, the substrate inspection method comprising:
   holding the substrate by a holder configured to be moved in a horizontal direction;
   emitting visible light from a first light source unit to the substrate held by the holder;
   emitting infrared light from a second light source unit to the substrate held by the holder;
   capturing a visible light image of the surface of the substrate by receiving, with a first imaging sensor, first reflected light emitted from the substrate as a result of radiating the visible light;
   capturing an infrared light image of the surface of the substrate by receiving, with a second imaging sensor, second reflected light emitted from the substrate as a result of radiating the infrared light, and
   performing, by a controller, an inspection of the substrate by using the visible light image and the infrared light image, by capturing the visible light image with the first imaging sensor and capturing the infrared light image with the second imaging sensor in parallel as the holder is moving, thereby reducing a capture time of the first and second imaging sensors.

10. The substrate inspection method of claim 9, further comprising:
    changing the first reflected light and the second reflected light in a same direction by a direction changing unit,
    wherein, in the capturing of the visible light image, the first imaging sensor receives the first reflected light whose direction is changed by the direction changing unit, and
    in the capturing of the infrared light image, the second imaging sensor receives the second reflected light whose direction is changed by the direction changing unit.

11. The substrate inspection method of claim 9,
    wherein the first imaging sensor and the second imaging sensor are accommodated in a same camera.

12. The substrate inspection method of claim 9, further comprising:
    adjusting the visible light from the first light source unit and the infrared light from the second light source unit by an incident direction adjusting unit such that the visible light from the first light source unit and the infrared light from the second light source unit are incident on the substrate in a same incident direction.

13. The substrate inspection method of claim 9, wherein the visible light incident on the substrate, the infrared light incident on the substrate, the first reflected light emitted from the substrate, and the second reflected light emitted from the substrate are on a same optical axis.

14. The substrate inspection method of claim 9, wherein the holder, the first light source unit, the second light source unit, the first imaging sensor, and the second imaging sensor are accommodated in an imaging unit.

15. The substrate inspection method of claim 9, wherein, in the performing of the inspection, the controller detects a defect on the surface of the substrate by comparing the visible light image and the infrared light image.

16. The substrate inspection method of claim 9, wherein the visible light image is an image obtained by synthesizing multiple types of color component images having different color components, and
the substrate inspection method further comprises controlling, by the controller, a display unit to display an image obtained by synthesizing the infrared light image and at least one of the multiple types of color component images.

17. A recording medium having stored thereon a computer-executable substrate inspection program that, in response to execution, cause a substrate inspection apparatus to perform an inspection of a substrate with an image obtained by imaging a surface of the substrate,
wherein the substrate inspection program comprises:
holding the substrate by a holder configured to be moved in a horizontal direction;
emitting visible light from a first light source unit to the substrate held by the holder;
emitting infrared light from a second light source unit to the substrate held by the holder;
capturing a visible light image of the surface of the substrate by receiving, with a first imaging sensor, first reflected light emitted from the substrate as a result of radiating the visible light;
capturing an infrared light image of the surface of the substrate by receiving, with a second imaging sensor, second reflected light emitted from the substrate as a result of radiating the infrared light, and
performing, by a controller, an inspection of the substrate by using the visible light image and the infrared light image, by capturing the visible light image with the first imaging sensor and capturing the infrared light image with the second imaging sensor in parallel as the holder is moving, thereby reducing a capture time of the first and second imaging sensors.

18. The substrate inspection apparatus of claim 1, further comprising:
a direction changing unit configured to change the first reflected light and the second reflected light in the horizontal direction,
wherein the first imaging sensor receives the first reflected light whose direction is changed by the direction changing unit, and
the second imaging sensor receives the second reflected light whose direction is changed by the direction changing unit.

19. The substrate inspection apparatus of claim 18, wherein the first imaging sensor and the second imaging sensor are accommodated in a same camera, and
the direction changing unit is disposed between the holder and the camera.

20. The substrate inspection method of claim 9, further comprising:
changing the first reflected light and the second reflected light in the horizontal direction by a direction changing unit,
wherein, in the capturing of the visible light image, the first imaging sensor receives the first reflected light whose direction is changed by the direction changing unit, and
in the capturing of the infrared light image, the second imaging sensor receives the second reflected light whose direction is changed by the direction changing unit.

21. The substrate inspection method of claim 20, wherein the first imaging sensor and the second imaging sensor are accommodated in a same camera, and
the direction changing unit is disposed between the holder and the camera.

* * * * *